Oct. 21, 1969    R. KRAFT    3,473,410
REPEAT TRANSMISSION
Filed Dec. 18, 1967    2 Sheets-Sheet 1

RUPERT KRAFT

INVENTOR.

BY Wendroth, Lind & Ponack.
Attorneys

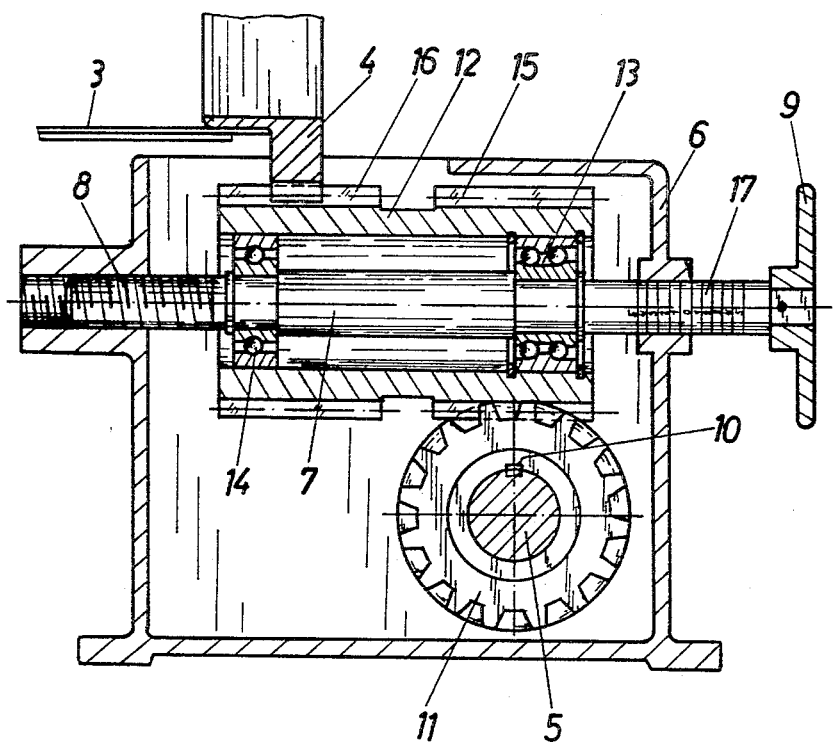

United States Patent Office 3,473,410
Patented Oct. 21, 1969

3,473,410
REPEAT TRANSMISSION
Rupert Kraft, Klagenfurt, Austria, assignor to
Johannes Zimmer
Filed Dec. 18, 1967, Ser. No. 691,573
Claims priority, application Austria, Dec. 30, 1966,
A 12,024/66
Int. Cl. F16h 35/06, 37/06
U.S. Cl. 74—665                                    1 Claim

ABSTRACT OF THE DISCLOSURE

A repeat transmission for the precise repeat adjustment of two or more rotating operating parts especially in printing machines. The different operating parts are driven by a common driving shaft with a first spiral gear for each rotating operating part arranged on the common driving shaft and is rotatable with the latter. The first spiral gear is in mesh with a second spiral gear which is displaceable and adjustable in the direction of its axis crossing the axis of the first spiral gear. The second spiral gear is connected with an end wheel of the repeat transmission which is rotatable with the second spiral gear and is arranged in axial direction beside the latter. The end wheel is a spur gear and the second spiral gear is displaceable and adjustable in axial direction.

This invention relates to a repeat transmission for the precise repeat adjustment of two or more rotating operating parts, preferably in machines for the treatment of flatshaped materials, especially in printing machines, the devices coordinated to the different working operations being driven by a common driving shaft.

Various repeat transmissions in printing or other machines are known which are provided to harmonize different working operations, for example to adjust a number of driven or freely rotating cylindrical rollers, rotary screens or similar rotating operating parts relative to one another in order to assure a synchronism. As practice has shown, cylindrical rollers, rotary screens or the rotating operating parts never have an absolutely equal diameter; therefore a rigid coupling has to be established between the latter in order to compensate the irregularities occurring upon each rotation. Without this rigid coupling, each cylindrical roller, rotary screen or other rotating operating part would roll off according to its circumference and the irregularities would be added in the sense that the different colours would not harmonize in textile or paper multi-color printing.

These shortcomings have been eliminated in roller printing machines for textile and paper printing by means of the central wheel on the pressure cylinder and the repeat wheels on the rollers. In these roller printing machines the engraved printing rollers are concentrically arranged around a medium pressure cylinder having a large diameter.

In other printing machines the cylindrical rollers, rotary screens or the like are arranged one after another in direction of passage of the material and are coupled through a chain drive or a longitudinal shaft by means of bevel or helical gears. In order to adjust these cylindrical rollers, rotary screens or the like relative to one another, various complicated and expensive transmissions are known which consist of a plurality of gears, couplings and adjusting means.

However, the invention seeks a simpler solution which is attained in that a first spiral gear for each rotating operating part is arranged on the common driving shaft and is rotatable with the latter, said first spiral gear being in mesh with a second spiral gear which is displaceable and adjustable in direction of its axis crossing the axis of said first spiral gear provided on the common driving shaft, said second spiral gear being connected with an end wheel of the repeat transmission which is rotatable with said second spiral gear and in axial direction beside the latter.

The movement is transferred over the end wheel of the repeat transmission on the rotating operating parts coordinated to the different working operations which are to be harmonized, for example to cylindrical rollers, rotary screens, etc.

This transfer of movement is obtained most simply if the end wheel of the repeat transmission is a spur wheel engaging in a corresponding spur wheel of the operating parts to be driven. The end spur wheel of the repeat transmission is usually provided with an axis parallel toothing since in this case the operating parts to be driven may be axially displaced, if necessary, without any distortion of the latter.

The axial displacement of the second spiral gear the axis of which crosses the axis of the common driving shaft causes a rotation of said spiral gear and of the spur gear connected therewith on the one hand or of the common driving shaft on the other; in the preferred case in which the helical gearing of the two spiral gears in mesh is 45°, the arc length of the rotation is equal to the axial displacement of the second spiral gear.

The extent of the axial displacement and thus the corresponding arc measure of the rotation may be read on a linear scale which can also be provided with a nonius or a micrometer reading.

A particularly convenient and simple embodiment of the repeat transmission according to the invention consists in that the axially displaceable and adjustable second spiral gear and the end wheel connected with the latter, especially the spur gear, are arranged on a common tube which is rotataby mounted on a spindle shaft and is axially displaceable and adjustable with the latter.

An embodiment is hereinafter described with reference to the accompanying drawings without the invention being limited to it.

FIGURE 2 is an exploded vertical section transversely to the axis of the common driving shaft through one of the repeat transmissions.

Figure 1:
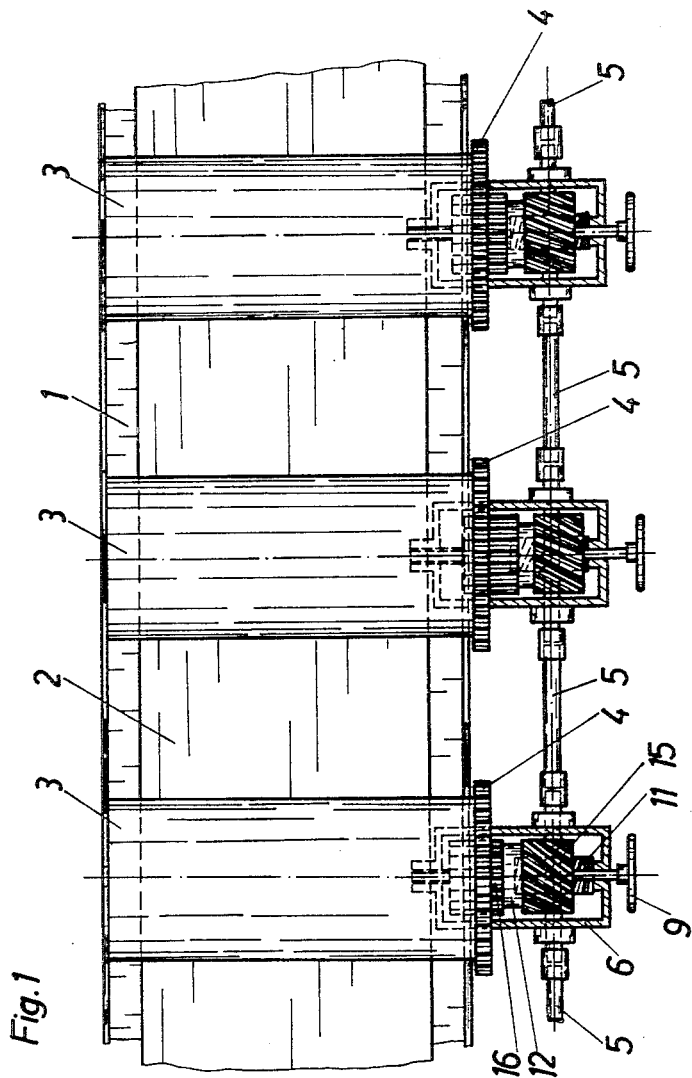
FIGURE 1 is a plan view showing a section of a screen rotary machine with rotary screens, the casings of the repeat transmissions being represented in horizontal section.

In a known manner the screen printing machine according to FIGURE 1 consists of a rotating blanket 1 supporting and transporting the material 2 to be printed. Over the blanket 1 or the material several rotary screens 3 are arranged one after another in the direction of passage of the material, the guiding means of which are not represented in the drawings for reasons of clearness. However, the spur gears 4 connected with the rotary screens 3, having the form of toothed wheels are represented. The rotary screens 3 or their spur gears 4 are driven by a common shaft 5 through one repeat transmission.

Each of the repeat transmissions consists of a casing 6 through the lower part of which passes the common-driving shaft 5 or a part thereof in longitudinal direction of the machine, i.e. in parallel with the direction of passage of the material and in the upper part of which a spindle shaft 7 is mounted in such manner that the axis of the spindle shaft 7 is provided with a thread 8 which engages in a thread bore in the casing 6 of the repeat transmission. On its other end the spindle shaft is provided with a handwheel 9. A spiral gear 11 with a helical gearing of 45° which is not displaceable in axial direction, is mounted on the driving shaft 5 by means of a wedge 10.

On the spindle shaft 7, a freely rotatable tube 12 is mounted through a ball bearing 13, 14 the ball bearing 13 having the form of a double ball journal bearing for receiving axial forces. Outside in the zone over the spiral wheel 11 mountd on the driving shaft 5, the tube 12 has the form of a corresponding spiral gear 15, i.e. it is provided with a helical gearing of 45°.

In a zone displaced in axial direction with regard to the spiral gear 15 the tube is provided outside with a zone of an axis parallel toothing, thus it has the form of a spur gear 16.

The spiral gear 11 is in mesh with the spiral gear 15, the spur wheel 16 is in mesh with the toothed wheel of the rotary screen 3 having the form of a spur gear 4.

The spiral wheel 15 is adjustable and displaceable in axial direction; in the represented embodiment this is attained in that the tube 12 with the spindle shaft 7 is displaced in axial direction upon rotation of the latter (for example by means of the handwheel 9 or a mechanical device). Because of the helical gearing of the spiral 11 and 15 the tube 12 is rotated, i.e. in the case of a helical gearing of 45° by an arc length which is equal to the axial displacement of the tube 12. The displacement may be read on the scale 17 on the spindle shaft 7. By the rotation of the tube 12 the spur gear 4 and the rotary screen are also rotated through the rotating spur gear 16, this rotation being decreased or increased by the step-down or step-up. The rotation thus obtained of the rotary screen in or opposed to the direction of passage of the material permits the precise adjustment of repeat of the different colours in the design to be printed.

FIGURE 1 shows a different adjustment of the three represented repeat transmissions, the left transmission showing the maximum adjustment in one direction, the medium transmission the maximum adjustment in the other direction and the right transmission a mid-position.

In the repeat adjustment as described, the spur gear 16 mounted on a common tube 12 with the axially displaceable spiral gear 15 is obviously displaced in axial direction. Experience has shown that the function of the machine is not disadvantageously affected thereby. Care must only be taken of the fact that the toothing of at least one of the spur gears 4 or 16 extends over an axial distance in such way that a satisfactory mesh of the spur gear 4 of the screen with the spur gear 16 is assured in any position of the axial displacement. It would also be possible to couple the spiral gear 15 with the spur gear 16 in such manner that a connection is established between the spiral gear 15 being displaced in axial direction. This is simply attained in that the spur gear 16 is axially displaceable with regard to the spiral gear 15, but is protected against axial displacement with regard to the casing 1 of the repeat transmission.

The invention is by no means limited to the embodiment described and represented. Apart from rotary screen printing machines, roller printing machines, rotary screen printing machines, machines for paper processing and stamping, machines can be cited in which repeat transmissions according to the invention can be used. Furthermore, this repeat transmission may also be used for trains of operating parts wherein different working operations or different rotating operating parts are to be precisely harmonized by a common driving shaft.

What I claim is:

1. A repeat transmission for the precise repeat adjustment of a plurality of printing cylinders in a printing machine wherein said cylinders are arranged one after the other in the direction of passage of the material to be printed comprising a first spur-gear fixed to each of said printing cylinders coaxially and rotatably, a common driving shaft arranged at right angles to the axes of said printing cylinders, a repeat transmission connecting each of said printing cylinders to said driving shaft, each of said repeat transmissions comprising a first spiral gear fixed to said driving shaft, the axis of said first spiral gear coinciding with the axis of said driving shaft, said first spiral gear being rotatable with said drivng shaft, a second spiral gear having its axis crossing the axis of said first spiral gear at a right angle and being in mesh with said first spiral gear, said second spiral gear being displaceable and adjustable in the direction of its axis and a second spur-gear connected coaxially and rotatably with said second spiral gear in mesh with said first spur gear.

References Cited
UNITED STATES PATENTS

| | | | |
|---|---|---|---|
| 2,163,672 | 6/1939 | Ferris | 74—665 |
| 2,260,402 | 10/1941 | Potdevin. | |
| 2,372,783 | 4/1945 | Jacobson | 74—395 |
| 2,608,879 | 9/1952 | Megel et al. | 74—670 X |

ARTHUR T. McKEON, Primary Examiner

U.S. Cl. X.R.

74—396; 101—217; 226—24